United States Patent [19]

Heidman, Jr.

[11] Patent Number: 4,480,249

[45] Date of Patent: Oct. 30, 1984

[54] ALARM SYSTEMS FOR AUTOMOTIVE VEHICLES

[76] Inventor: William A. Heidman, Jr., 4604 Robbins, San Diego, Calif. 92122

[21] Appl. No.: 398,104

[22] Filed: Jul. 14, 1982

Related U.S. Application Data

[63] Continuation-in-part of Ser. No. 139,789, Apr. 14, 1980, Pat. No. 4,354,174.

[51] Int. Cl.³ .............................................. B60R 25/00
[52] U.S. Cl. ............................ 340/63; 307/10 AT
[58] Field of Search .................. 340/63, 64, 65, 74, 340/72, 75, 76, 81 F, 83, 88; 315/83, 84; 307/10 AT, 10 LS

[56] References Cited

U.S. PATENT DOCUMENTS

| | | | |
|---|---|---|---|
| 3,792,435 | 2/1974 | Pace et al. | 340/63 |
| 3,858,175 | 12/1974 | Kopera, Jr. | 340/63 |
| 3,891,967 | 6/1975 | Betts | 340/63 |
| 3,913,066 | 10/1975 | Kehry et al. | 340/63 |
| 3,997,870 | 12/1976 | Horvath | 340/63 |
| 4,220,947 | 9/1980 | Yamamoto | 340/63 |

Primary Examiner—Donnie L. Crosland
Attorney, Agent, or Firm—Frank D. Gilliam

[57] ABSTRACT

An alarm system for an automotive vehicle. In one embodiment the opening of selected movable vehicle structural panels when the alarm is activated causes intermittent operation of the vehicle brake lights, front turn signal lights and the blasting of the vehicle horn. In a second embodiment the opening of selected movable vehicle structural panels when the alarm is activated causes intermittent operation of the vehicle parking lights front and rear, the blasting of the vehicle horn and includes an indicator for determining the on or off status of the parking lamps from within the vehicle. In both embodiments diodes are used to allow normal operation of the hazard lamps, turn signal, horn and parking lamps of the vehicle without activating the alarm system.

15 Claims, 2 Drawing Figures

4,480,249

ALARM SYSTEMS FOR AUTOMOTIVE VEHICLES

BACKGROUND OF THE INVENTION

This application is a continuation-in-part of my copending U.S. patent application having Ser. No. 139,789, filed Apr. 14, 1980 now U.S. Pat. No. 4,354,174.

Recently at least one model of the Cadillac automobile has been available with a theft deterrent alarm system. When activated or armed anyone unlocking the automobile from the inside, for example, through an open window, causes the horn to blast intermittently and the headlamps to flash on and off. A starter disablement circuit associated therewith, thereafter prevents the automobile engine from being started by its conventional ignition key. The Cadillac system can be inactivated by unlocking the vehicle with the normal outside door lock. Details of the specific circuitry of the Cadillac alarm system are not presently known to me.

In my prior U.S. Pat. Nos. 2,519,758; 2,520,363; 2,766,343; 3,263,211; 3,372,373; and 3,372,374 and my allowed U.S. Pat. No. 4,354,174 having Ser. No. 139,789, filed Apr. 14, 1980, and my pending U.S. application having Ser. No. 387,457 filed June 11, 1982, I have disclosed a combined ignition and starter switches, circuits and locks, as well as various flashing hazard light circuits which are adapted to be incorporated into the electrical system of existing automobiles with readily available and inexpensive components. Also of general interest in the automobile wiring art are U.S. Pat. Nos. 2,321,803; 2,579,758; 2,654,079; 2,667,603; 2,761,121; 2,802,142; 2,812,396; 2,844,810; 3,074,049; 3,182,289; and 3,185,961.

SUMMARY OF THE INVENTION

The present invention is directed to automotive vehicle alarm systems and particularly to theft deterrent and operator "lights on" reminder systems which can easily and inexpensively be incorporated into existing automotive vehicle electrical systems.

This invention provides means for interconnecting existing door operated courtesy interior light switches and adding similar type switches at various other selected locations, such as, the trunk, hood, sun roof, etc., where they are operated by the opening or removal of these and similar normally closed vehicle structural panels. In one embodiment, the opening of any of these vehicle structural panels when the alarm is activated causes the vehicle front turn signal lamps and rear brake lamps to flash and the horn to blast intermittently. In a second embodiment when the alarm system is activated by the opening of a vehicle structural panel, the front and rear parking lamps flash and the horn blasts intermittently. In addition, the second embodiment includes an intermittent interior lamp which illuminates when the parking lamps are illuminated and a vehicle structural panel having a switch is opened, as when the operator exits the vehicle having forgotten to extinguish the vehicle parking lamps.

Both embodiments of the invention provide series diodes to prevent alarm activation with the normal operation of the hazard warning lamps, turn signal, horn or parking lamps.

Also, both embodiments include a series relay which maintains the activation of the alarm system when the initiating vehicle structural panel switch is opened by the closing of the associated vehicle panel, such as in my pending patent, Ser. No. 139,789.

It is therefore an object of this invention to provide a vehicle alarm system that will provide attention getting intermittent flashing of the brake lamps and turn signal lamps and horn or the parking lamps and horn with an unauthorized opening of a vehicle structural panel.

Another object of this invention is to provide continued intermittent operation of the hazard warning lamps and horn or parking lamps and horn after the opened or unmoved vehicle structural or access panel is closed or replaced.

Another object of this invention is to provide a vehicle alarm system which will not be activated by the normal operation of the turn signal lamps, hazard lamps, parking lamps or the vehicle horn.

Still another object of this invention is to provide a warning indicator within the vehicle equipped with parking lamps to alert the vehicle operator as to the on or off status of the vehicle parking lamps upon egressing the vehicle.

These and other objects of the invention will become apparent from the following description taken together with the accompanying drawings.

DETAILED DESCRIPTION OF THE DRAWINGS

Figure 1:
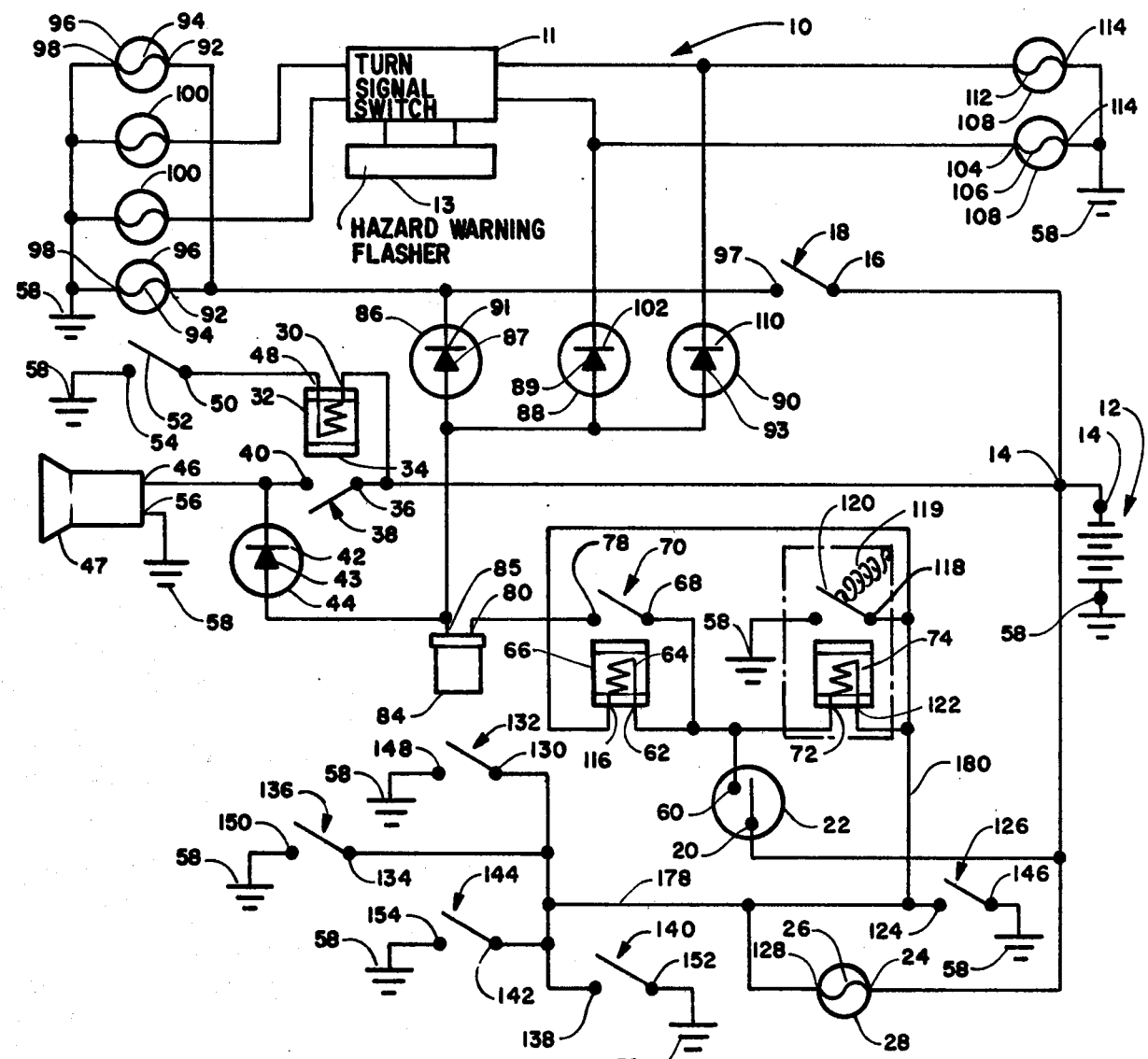
FIG. 1 is a schematic wiring diagram depicting one embodiment of this invention.

Throughout the figures and detailed description, the same reference numerals depict the same element or part.

Referring now specifically to FIG. 1, the reference numeral 10 generally designates the circuit of the first embodiment of the vehicle alarm system of this invention. The circuit of the first embodiment of the invention is shown connected to the conventional rear brake lamps, turn signal and horn circuit of an automotive vehicle having turn signal and hazard warning circuits 11 and 13 respectively.

A conventional vehicle storage battery 12 has its positive terminal 14 connected in parallel to terminal 16 of a conventional foot brake pedal operated brake lamp switch 18; to terminal 20 of an arming or alarm system's activation switch 22; to terminal 24 of filament 26 of the vehicle interior courtesy lamp 28; to terminal 30 of coil 32 of the horn relay 34; and to terminal 36 of horn relay activated switch 38.

Terminal 40 of horn relay activated switch 38 is connected in parallel to cathode 42 of diode 44 and vehicle horn terminal 46. Terminal 48 of coil 32 of horn relay 34 is connected to terminal 50 of a conventional horn press to activate switch 52 generally located on the vehicle steering wheel not shown. Terminal 54 of switch 52 and terminal 56 of the vehicle horn are connected to battery 12 negative terminal 58.

Terminal 60 of arming switch 22 is connected to terminal 62 of coil 64 of relay 66; to terminal 68 of relay activated switch 70; and to terminal 72 of coil 74 of relay 76.

Terminal 78 of switch 70 is connected to terminal 80 of a conventional automotive flasher element 84 generally of the thermal type, but not so limited. Terminal 85 of the flasher element 84 is connected in parallel to the anodes 43, 87, 89 and 93 respectively of diode 44, 86 88, and 90. The diodes may be of like or of different types. The only requirement of the diodes is that battery current flow with negligible resistence in the direction from anode to cathode and have a maximum resistence to current flow in the opposite direction. The cathode 91 of diode 86 is connected to terminals 92 of filaments 94 of brake lamps 96 and to terminal 97 of brake switch 18. Terminals 98 of brake lamp filaments 94 are connected to negative terminal 58 of battery 12. The cathode 102 is connected to terminal 104 of filament 106 of vehicle front turn signal lamp 108. Likewise cathode 10 is connected to filament 112 of a second turn signal lamp 108, one being on each side of the vehicle. The terminals 114 of the front turn signal lamp 108 are connected to the negative terminal 58 of battery 12. It should be understood that the turn signal lamps 108 are connected to the turn indicator switch in a conventional manner.

Terminal 116 of coil 64 of relay 66 is connected to terminal 118 of switch 120, to terminal 122 of coil 74 of relay 76, to terminal 124 of trunk access switch 126, to terminal 128 of filament 26 of courtesy lamp 24, to terminal 130 of door access switch 132, terminal 134 of hood access switch 136, terminal 138 of fuel fill access door switch 140 and terminal 142 of door access switch 144. Terminals 146, 148, 150, 152, and 154 of their associated access switches are connected to terminal 58 of battery 12.

THEORY OF OPERATION OF FIG. 1

The arming switch 22 is activated connecting terminal 20 to terminal 60. The alarm system is now activated. Nothing will occur unless one of the switches 126, 132, 136, 140 or 144 is closed by the opening or removal of an associated vehicle access panel. When any one or more switches are closed, current flows through the coil 64 of relay 66 closing switch 70. Current flows through switch 70, through flash element 84 causing the flasher to intermittently open and close the circuit between its terminals 80, 85. When the flasher element circuit is closed, current flows through diodes 44, 86, 88, and 90.

Current flowing through diode 44 causes the horn 47 to intermittently honk, current through diode 86 flashes the rear vehicle brake lamps 96, current through diode 88 flashes the right front turn signal lamp 108 and diode 90 flashes the left fron turn signal lamp 108. When the flasher circuit is open no current will flow through the diode.

With one of the access panel switches closed, current flows through coil 74 of relay 76 causing switch 120 associated therewith to close providing an additional circuit ground to the alarm system. With switch 120 now closed if the original access switch or switches which initially activated the alarm are again opened by closure of the offending vehicle access panel or panels, the lights will continue to flash and the horn honk intermittently.

The system can only be de-activated by the switch 22 being placed in the off position opening the connector between terminals 20 and 60, as shown in the figure.

The Switch 22 may be located in any convenient location on the exterior of the vehicle. Suggested locations, by way of example, may be in the vehicle door or associated with the fuel access door lock.

In the event the vehicle alarm system is activated and left on for a long period of time, a spring 119 associated with the relay switch 120 is calibrated so that it will bias the switch open against the magnetism created by the coil 74 of relay 76 when the battery reaches a predetermined voltage level. The predetermined voltage level would be a level at which the battery will still start the vehicle.

DESCRIPTION OF THE SECOND EMBODIMENT

Figure 2:
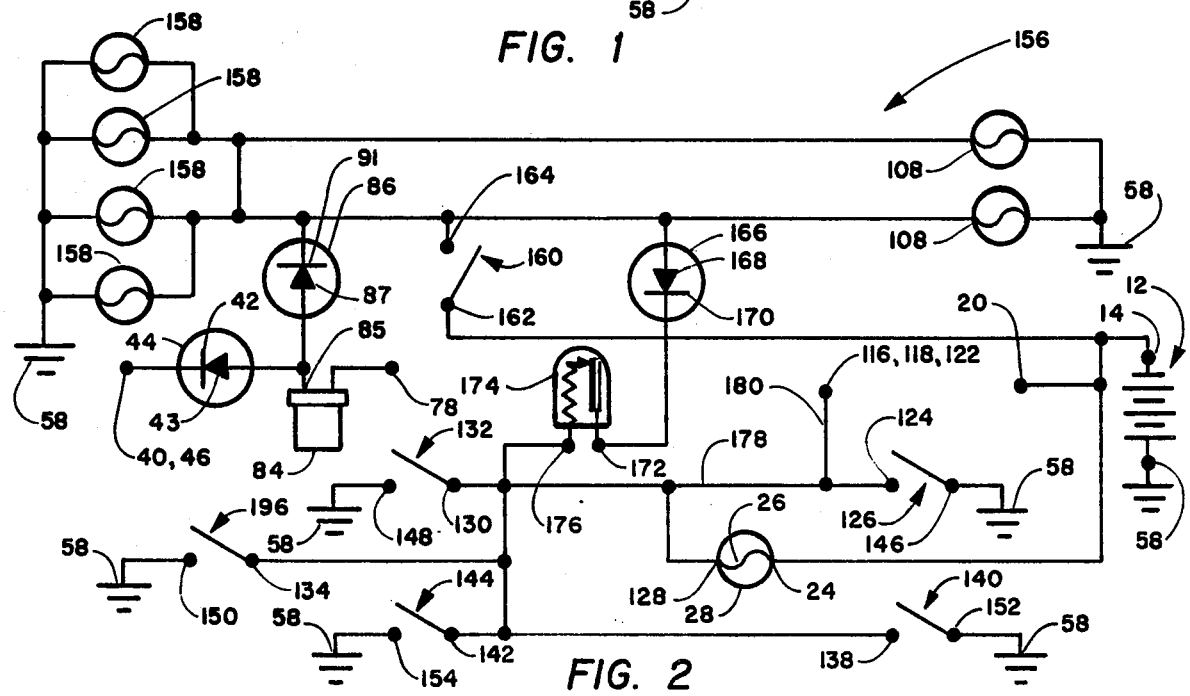
FIG. 2 is a schematic wiring diagram depicting a second embodiment of this invention.

Referring now to FIG. 2 wherein the circuit generally indicated as 156 shows a second embodiment of the invention.

The second embodiment is very much like the first embodiment except the alarm circuit is connected to the parking lamps 108, 158, six shown, instead of the combination brake lamps 96 and front turn signal lamp 108 as in the first embodiment. In this embodiment diodes 88 and 90 are eliminated as is the brake lamp switch circuit. A parking lamp switch 160 has been added. Terminal 162 of switch 160 is connected to terminal 14 of battery 12 and terminal 164 of switch 160 is connected to one terminal of the filament of lamps 108 and 158.

An additional diode 166 with its anode element 168 connected to terminal 164 of switch 160, to the filaments of lamps 108, 158 and to cathode 91 of diode 86. The cathode 170 of diode 168 is connected to terminal 172 of flasher bulb 174. Terminal 176 of flash bulb 174 is connected to line 178 which is common to the high side of the vehicle access switches and parallel with line 180. The flasher bulb 174 is a conventional thermal flasher element with a series lamp filament. When current flows through the flasher bulb the lamp illuminates when when no current flows the lamp is extinguished.

THEORY OF OPERATION OF FIG. 2

It should be easily understood that the circuit of FIG. 2 operates in the same manner as does the circuit of FIG. 1. Parking lamps are utilized in place of the brake lamp/front turn signal lamp combination of FIG. 1. The rest of the alarm circuit remains and operates in the manner discussed above.

The additional diode 166 and flasher lamp 174 provides the vehicle operator a flashing light signal when he is egressing the vehicle and he has inadvertantly left his parking lamps illuminated. For practical purposes it also gives the operator an indicator that his head lamps are still on as the parking lamps are generally illuminated along with the vehicle head lamps.

It should be understood that normal operation of the parking lamps, brake lamps, turn signal, hazard and horn will not activate the alarm system.

It will be apparent to those skilled in this art that many modifications and variations may be effected without departing from the spirit and scope of the novel concepts of the present invention.

What is claimed is:

1. An alarm system for automotive vehicles having a horn and a source of electrical power comprising:
   front and rear indicator lamps;
   a power activating and deactivating switch connected to said source of electrical power and switchable between system activated and system inactivated positions;
   a system activating means inter-connected to said power activating and deactivating switch;
   an activated alarm system maintaining means associated with said system activating means;

an alarm system inactivating means associated with said source of electrical power and said system activating means for inactivating said alarm system when said source of electrical power is at a predetermined voltage level; and a plurality of parallel connected switching means associated with vehicle movable structural panels switchable between off and on positions by the opening and closing respectively of said panels, whereby when said power activating and deactivating switch is in said system activated position and at least one of said plurality of parallel connected switching means is repositioned from an off to an on position said system activating means activates said alarm system causing said horn to intermittently blast and when said at least one of said plurality of parallel connected switching means is returned to its off position said activated alarm system maintaining means causes said horn to intermittently blast until said power activating and deactivating switch is returned to its deactivated position or said source of electrical power reaches said predetermined voltage level.

2. The invention as defined in claim 1 additionally comprising an electrical circuit flasher element in series between said system activating means and said front and rear indicating lamps and said horn for intermittently flashing said lamps and blasting said horn.

3. The invention as defined in claim 1 or 2 wherein said rear indicator lamps are brake lamps and said front indicator lamps are parking lamps.

4. The invention as defined in claim 1 or 2 wherein said front and rear indicator lamps are parking lamps.

5. The invention as defined in claim 1 or 2 wherein isolation means are provided between said system activating means and said front and rear indicator lamps and said horn, whereby normal operation of said front and rear indicator lamps and said horn does not energize said alarm system.

6. The invention as defined in claim 1 or 2 wherein a flasher lamp positioned within said vehicle interior is connected to said front and rear lamps and said plurality of parallel connected switching means, whereby when said front and rear lamps are illuminated and one of said plurality of parallel connected switching means is closed, said flasher lamp intermittently illuminates.

7. The invention as defined in claim 1 wherein said activated alarm system maintaining means comprises a calibrated spring bias means.

8. An alarm system for automotive vehicles having front and rear turn signal lamps operated either by a turn signal indicator, hazard warning or brake switch circuits, a horn and a source of electrical power comprising:

a single pole-single throw, anti-theft switch having first and second connections, said first connection connected to said source of electrical power;

an arming relay having an input and output, said input is connected to said second connection of said anti-theft switch;

a holding relay interconnected to said output of said arming relay and said second connection of said anti-theft switch;

a flasher element having an input and output connection, said input connection connected to the output of said anti-theft relay;

a plurality of parallel connected mechanical switching means associated with the vehicle access panels, switchable between on and off positions, whereby when said anti-theft switch is in a position to connect said source of electrical power to said arming and holding relay and at least one of said plurality of parallel connected mechanical switching means is switched from an open to a closed state by the opening of its associated vehicle access panel, said arming relay activates, supplying said source of electrical power to the input of said flasher element causing said horn to be intermittently activated and deactivated and when said at least one of said plurality of parallel connected switching means is returned to its off position, said holding relay causes said arming relay to remain activated until said anti-theft switch is returned to a position wherein the electrical power is removed from said holding relay.

9. The invention as defined in claim 8 wherein an alarm system means is provided for inactivating the holding relay when said source of electrical power is at a predetermined level.

10. The invention as defined in claim 8 wherein said alarm system further comprises at least one diode means connected in series between the output of said flasher element and said front and rear turn signal lamps whereby said front and rear turn signal lamps are intermittently activated and deactivated when the alarm system is in an activated state, and when the alarm system is in an inactivated state said at least one diode prevents interaction of said alarm system and isolation from the normal functioning of the turn signal lamps.

11. The invention as defined in claim 10 wherein said at least one diode means comprises three diodes having anodes and cathodes, said anodes of each said diodes are connected to the output of said flasher element, the cathodes of one diode is connected to said brake switch circuit, the cathode of the second diode is connected to left turn signal circuits and the cathode of the third diode is connected to right turn signal circuit.

12. The invention as defined in claim 11 wherein said automotive vehicle further comprises a parking lamp circuit and the cathode of said second diode is connected only to said parking lamp circuit.

13. The invention as defined in claim 10 further comprising a parking lamp circuit, a flasher bulb positioned within said automotive vehicle and said at least one diode means comprises two diodes, one connected between said flasher and said parking lamp circuit and the other between said flasher and said plurality of parallel connected switching means through said flasher bulb, whereby when said alarm system is activated said parking lamps and said flasher bulb intermittently illuminate.

14. The invention as defined in claim 8 wherein said automotive vehicle further includes an interior courtesy lamp which intermittently illuminates when said flasher element is activated.

15. The invention as defined in claim 13 wherein said vehicle further includes an interior courtesy lamp interconnected between said flasher lamp and said plurality of parallel connected switches.

* * * * *